United States Patent Office 2,911,287
Patented Nov. 3, 1959

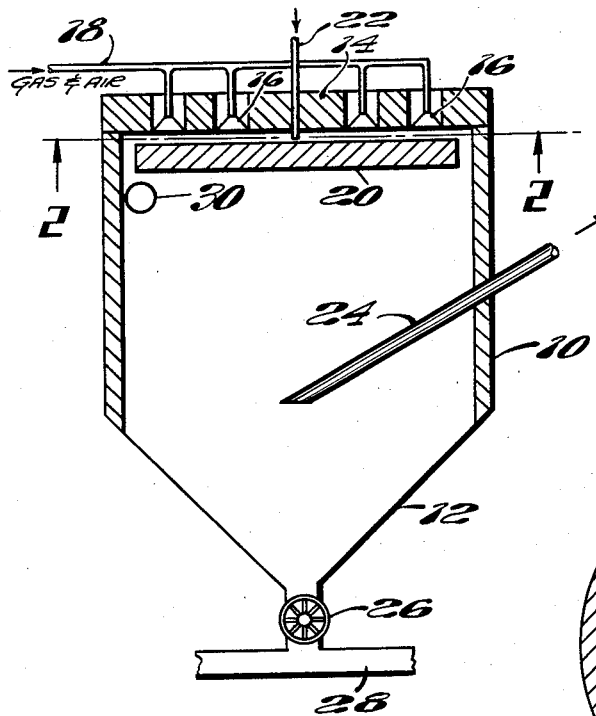
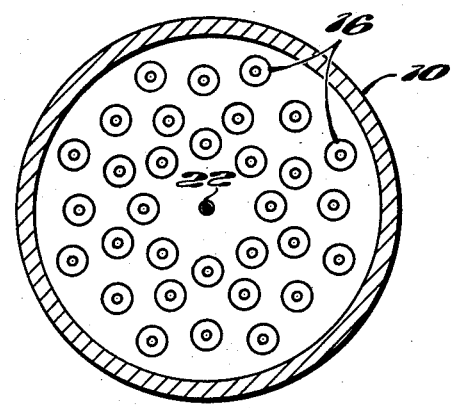
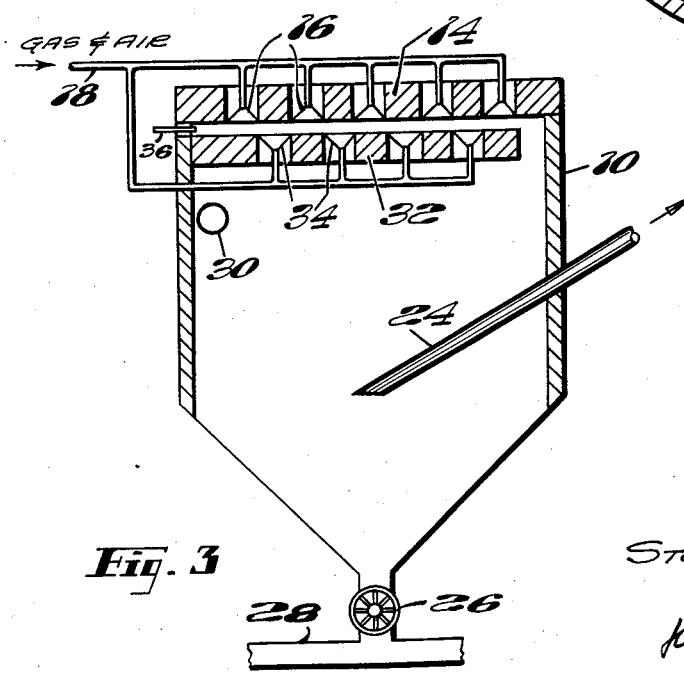
Fig. 1
Fig. 2
Fig. 3
INVENTOR.
STUART V. STODDARD

2,911,287

THERMAL CARBON BLACK PROCESS

Stuart V. Stoddard, Needham, Mass., assignor to Godfrey L. Cabot, Inc., Boston, Mass., a corporation of Massachusetts Application February 13, 1957, Serial No. 640,036

5 Claims. (Cl. 23—209.4)

This invention relates to a process and apparatus for the production of carbon black.

In all of the presently practiced processes for producing carbon black no more than about a half, and often less, of the carbon content of the hydrocarbon raw material is recoverable as product. The channel process yields at best about two pounds from the thirty-four or so pounds available in each thousand cubic feet of natural gas. The gas furnace process may provide recoveries of up to about twelve pounds of carbon per M c.f. of gas while in the oil furnace process, yields of some four of the 7–8 available pounds of carbon in each gallon of oil are obtainable. Somewhat higher yields of carbon black from natural gas are realized in the thermal process but even there yields do not appreciably exceed the fifty percent factor at about 19–20 pounds per M c.f. of gas.

It is the principal object of my invention to provide a novel process and apparatus for thermally dissociating carbon black from hydrocarbons.

It is a further object of this invention to provide such a process and apparatus for obtaining much higher yields of carbon black than have been obtainable by prior art processes.

Further objects achieved by my invention are greater efficiency and simplicity of operation and the provision of more modest and hence less expensive equipment per unit quantity of product obtained.

The process of this invention comprises flowing a gaseous or vaporized liquid hydrocarbon across a direct flame heated refractory surface at sufficient velocity to prevent substantial deposition of carbon black thereon, dissociating the hydrocarbon to carbon black and gaseous by-products, sweeping the carbon black away from the hot refractory surface in the flame combustion products and other gases and recovering the carbon black.

The apparatus of this invention in which the foregoing process may best be carried out comprises a heat-insulated chamber having a plurality of radiant burners in an end wall. A refractory slab of lesser area than the wall and which may or may not have burners therein, is affixed close to and more or less parallel to the end wall. One or more hydrocarbon injector pipes are directed to discharge into the area between wall and slab. The area behind the slab is unobstructed and preferably has a hopper-shaped bottom into which carbon black may settle for collection. A flue pipe connects into this unobstructed area at any convenient location. Advantageously, one or more pipes may connect into the side walls of the chamber in a direction parallel or tangential thereto in the area behind the slab to provide for the injection of gas to cool and impart rotation to the gases in the chamber.

The invention will best be understood and appreciated from the following description thereof taken in connection with the accompanying drawings in which Fig. 1 is a view in vertical cross section of one embodiment of the reactor, Fig. 2 is a plan view thereof taken along line 2—2 of Fig. 1, and Fig. 3 is a view in vertical cross section of another embodiment of reactor.

Referring first to Fig. 1 the apparatus consists of a refractory lined reaction chamber 10, preferably cylindrical in shape, having a hopper bottom 12. The end wall 14 is provided with a plurality of burners 16 supplied by fuel pipe 18. A refractory slab 20 is mounted close to the end wall and is of somewhat smaller area to permit flow of gases between its periphery and the side wall of the chamber 10. A hydrocarbon injector pipe 22 extends through end wall 14 and is directed against the surface of slab 20. A flue pipe 24 is connected into the chamber behind slab 20 for withdrawal of gases from the chamber. The bottom 12 connects through a conventional rotary valve 26 into a carbon black conveyor 28. Optionally a conduit 30 is connected tangentially into the side wall of the chamber 10 for the introduction of a cool, compatible gas at a velocity sufficient to impart spin to the gases therein whereby to achieve a cyclonic effect for improved separation of carbon black from the gases in which entrained and also to cool these gases.

The embodiment of reactor illustrated in Fig. 3 is similar to that of Fig. 1 except that a portion of the periphery of the slab 32 is butted against the chamber side wall and is equipped with burners 34. Also the hydrocarbon injector 36 extends through a side wall between and in a direction parallel to end wall 14 and slab 32. The burners 16 and 34 are respectively offset from one another so that the flame from each will impinge upon refractory surface.

Any convenient type of burner adapted to provide complete combustion of fuel may be employed in the practice of my invention. Particularly suitable is the Selas Duradiant burner because of its high radiant energy heating efficiency. This type burner consists of a refractory cup having an inlet at the base in which a plug is axially mounted. The plug may be slightly smaller than the inlet opening or be grooved to permit the combustible gaseous mixture to flow into the cup and to spread over its inner surface. The gas burning against the cup surface causes the refractory to become incandescent and to beam radiant heat to the material being heated. Naturally, it is desirable to produce as much heat as possible from the fuel employed and to transfer the heat to the work area, which is well accomplished by the Duradiant burner.

The process of my invention is carried out as follows. A completely combustible mixture of fuel and air is supplied to the burners and ignited. When the refractory has become sufficiently hot, that is, has become incandescent, hydrocarbon is conducted to the dissociation reaction zone between end wall and slab. At the temperature prevailing therein, which is in excess of 2000° F., the hydrocarbon is instantly dissociated to carbon black and essentially hydrogen. The carbon black is quickly swept out of the reaction zone in the combustion product and dissociation by-product gases, all of which flow over the edge of the slab and into the open area behind it. While a considerable amount of the black will be carried out of the chamber in the exhaust gases, the greater proportion thereof will fall by gravity into the hopper bottom of the chamber from which it can readily be removed through the rotary valve.

Carbon black recovery in the chamber itself can substantially be improved by injecting supplemental gas into the chamber behind the slab in a direction to cause the gases therein to spin. When the chamber is cylindrical in shape, which is preferred, a cyclonic effect is achieved by such injection which causes agglomeration of the carbon black particles while effecting their separation from the gases. Advantageously, the supplemental gas will be cool when introduced to accomplish some reduction in temperature of both carbon black and exhaust gases.

The type of carbon black produced by this process is that customarily identified by the term "thermal black." Heretofore, such type black has been produced by a cyclic process in which hydrocarbon gas is flowed through previously heated refractory checkerbrick. During the make cycle the gas is dissociated to carbon black, about half of which adheres to the brickwork and is burned off in the heating cycle.

It will be seen that the process of this invention constitutes a distinct improvement over the conventional thermal process. In my process little or no carbon black will be captured by the refractory since it is swept away as it forms and has no opportunity to adhere to the refractory. Consequently, substantially all of the carbon black dissociated from the raw material is recoverable as product.

Naturally, some of the carbon black, i.e., that composed of the finer particles, will be carried out of the chamber in the gas stream. Therefore it is desirable to conduct the tail gas from flue 24 through conventional separation equipment to recover this increment of black. Since such equipment is well known in the art, no further description thereof appears necessary.

The raw material employed in the practice of my invention may be natural gas or vaporized liquid hydrocarbons. The term "gaseous hydrocarbon" as used herein may thus be taken to include vaporous as well as naturally gaseous hydrocarbons.

The hydrocarbons may be introduced into the zone alone or admixed with a diluent gas which may be inert to the reaction or include a minor proportion of oxygen. In either case the presence of diluent gas results in a reduction of particle size of the black and, when air is added, in some loss in yield from burning. However, the use of such supplemental gas does not change the basic character of the reaction which is essentially a thermal dissociation, as a term of art, as distinct from the furnace combustion type of reaction.

The supplemental gas introduced into the chamber behind the slab through pipe 30 is preferably recycled tail gas from which the carbon black has been removed and which has been cooled. However, any compatible gas may be used for the purpose.

Having described my invention, I claim:

1. A continuous thermal process for producing carbon black which comprises burning a completely combustible mixture of fuel and air in separate multiple radiant flames firing directly against the inner surfaces of two closely-spaced parallel refractory walls maintained within a heat-insulated chamber to heat the surfaces to incandescence, said walls defining a shallow reaction zone, said flames being directed substantially perpendicularly to at least one of said walls and being deflected therebetween, flowing a hydrocarbon in the gaseous state through said shallow reaction zone, thermally dissociating the hydrocarbon to carbon black and gaseous by-products in said reaction zone by the heat radiated from said refractory walls, entraining the carbon black thus produced in the combustion product and by-product gases as an aerosol and conveying said carbon black out of the reaction zone and into a lower area of the chamber, separating a portion of the carbon black from the aerosol by gravity settling in the lower area of said chamber, and removing the carbon black and attenuated aerosol separately out of the chamber.

2. Apparatus for producing carbon black by thermal dissociation of hydrocarbons which comprises a heat insulated chamber segregated into an upper reaction zone and a lower settling zone, said reaction zone being defined by the surfaces of two closely spaced parallel refractory walls, separate multiple radiant burners located in at least one of said parallel refractory walls for heating said surfaces to incandescence, means for directing a hydrocarbon into the area between and into contact with said surfaces for thermally dissociating the hydrocarbon to carbon black and gaseous by-products in the reaction zone by the heat radiated from said refractory walls, means for conducting the aerosol produced in said reaction zone into said settling zone and means for conducting the gases and solids separately from said settling zone.

3. The process of claim 1 further characterized by introducing a cool inert gas into the chamber outside of the reaction zone in a direction and at a velocity sufficient to cause rotation of the gases therein.

4. The apparatus of claim 2 further characterized by one of the refractory walls being the end wall of the chamber and the other being of lesser area than the end wall.

5. The apparatus of claim 2 further characterized by being cylindrical in shape and having a conduit connected tangentially into the side wall thereof behind one of the refractory walls.

References Cited in the file of this patent

UNITED STATES PATENTS

| | | |
|---|---|---|
| 1,390,480 | Bancroft | Sept. 13, 1921 |
| 1,925,131 | Brownlee | Sept. 5, 1933 |
| 2,144,971 | Heller et al. | Jan. 24, 1939 |
| 2,558,760 | Keith | July 3, 1951 |
| 2,597,232 | Ekholm et al. | May 20, 1952 |
| 2,625,466 | Williams | Jan. 13, 1953 |
| 2,868,856 | Hale et al. | Jan. 13, 1959 |